US008493197B2

(12) United States Patent
Nakanishi et al.

(10) Patent No.: US 8,493,197 B2
(45) Date of Patent: Jul. 23, 2013

(54) LOAD SENSING DEVICE

(75) Inventors: Ryota Nakanishi, Kariya (JP); Koji Ito, Yatomi (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 191 days.

(21) Appl. No.: 13/075,780

(22) Filed: Mar. 30, 2011

(65) Prior Publication Data

US 2012/0025966 A1 Feb. 2, 2012

(30) Foreign Application Priority Data

Jul. 30, 2010 (JP) ................................ 2010-172984

(51) Int. Cl.
*B60Q 1/00* (2006.01)
(52) U.S. Cl.
USPC ............................................ 340/436; 701/45
(58) Field of Classification Search
USPC ............. 340/436, 988, 901; 701/45; 280/735, 280/730
See application file for complete search history.

(56) References Cited

U.S. PATENT DOCUMENTS

| 6,922,152 | B2 | 7/2005 | Sumi et al. | |
|---|---|---|---|---|
| 7,032,700 | B2 | 4/2006 | Sakai et al. | |
| 2003/0151240 | A1* | 8/2003 | Saitou et al. | 280/735 |
| 2005/0071062 | A1* | 3/2005 | Takao et al. | 701/45 |

FOREIGN PATENT DOCUMENTS

| JP | 2002-286536 A | 10/2002 |
|---|---|---|
| JP | 2003-240627 A | 8/2003 |
| JP | 2003-344145 A | 12/2003 |

* cited by examiner

*Primary Examiner* — Shirley Lu
(74) *Attorney, Agent, or Firm* — Buchanan Ingersoll & Rooney PC

(57) ABSTRACT

A load sensing device, which includes a load detecting device adapted to a seat and outputting a load signal in response to a strain generated at the load detecting device and which detects a load applied to the seat on the basis of the load signal, includes a determining device determining whether the seat is in an occupied state or in a vacant state based on a magnitude relationship between the load and a threshold value, a collision detecting device detecting a shock generated when a vehicle collides, an alarming device alarming that the shock is detected, and a memorizing device storing a diagnosis information indicating whether or not a zero-point adjustment of the load detecting device needs to be executed in response to a determination result of a state of the seat in the case where the shock is detected by the load detecting member.

18 Claims, 7 Drawing Sheets

LOAD SENSING DEVICE

CROSS REFERENCE TO RELATED APPLICATIONS

This application is based on and claims priority under 35 U.S.C. §119 to Japanese Patent Application 2010-172984, filed on Jul. 30, 2010, the entire content of which is incorporated herein by reference.

TECHNICAL FIELD

This disclosure generally relates to a load sensing device.

BACKGROUND DISCUSSION

Generally, an airbag apparatus is mounted on a vehicle. The airbag apparatus is generally configured so that an airbag accommodated within, for example, a center portion of a steering wheel, a dash panel provided in the vicinity of a passenger seat and the like is instantaneously inflated in a case where a shock, which is generated at the vehicle when the vehicle collides, is detected by a collision detecting means such as an acceleration sensor and the like in order to protect an occupant seated on a seat having the airbag.

Generally, in the case where the airbag apparatus is mounted on the vehicle, a load sensing device for sensing (detecting) the occupant is provided at the seat having the airbag (e.g. JP2003-344145A, JP2002-286536A and JP2003-240627A). The known load sensing device includes a load detecting means for outputting a load signal in response to a strain generated at the known load sensing device, so that a load applied on the seat is detected on the basis of the load signal outputted from the load detecting means.

According to the known load sensing device, a significant zero-point displacement (a zero-point shift) may occur at the load signal outputted from the load detecting means because of the shock generated at the vehicle when the vehicle collides. In other words, the load signal outputted from the load detecting means may indicate a predetermined load even if the occupant is not seated on the seat and a load applied to the seat is substantially zero. Therefore, in this case, if the load sensing device is kept being used, the load sensing device may mistakenly determine that the occupant is seated on the seat. Accordingly, in this case, when the shock is detected by the collision detecting means, a warning indicator and the like may be actuated in order to notify the passenger of an occurrence of an abnormality and in order to urge a user of the vehicle to take the vehicle to a maintenance factory such as a car dealership and the like.

In a case where the vehicle is took to the maintenance factory and the like, a maintenance engineer needs to reset a zero-point in response to the abnormality warning (i.e. the zero-point displacement is solved). Then, the maintenance engineer executes a sensitivity test. Hereinafter, a set of the reset of the zero-point displacement and the sensitivity test is referred to as a zero-point adjustment. In a case where the maintenance engineer determines that the load sensing device is continuously usable, the load sensing device is allowed to be continuously used.

However, for example, in a case where the occupant hits or kicks the seat, the shock corresponding to the shock to be generated when the vehicle collides may be detected by the collision detecting means. Generally, chances of the significant zero-point displacement to occur at the load signal outputted from the load detecting means is very small, because the load applied to the seat in this case is about a level of power generated by a human being, and no significant zero-point displacement is likely to occur. However, in the case where the abnormality is alarmed to the user of the vehicle in the case where the shock generated by hitting or kicking the seat is detected as the load having the level indicating a collision of the vehicle and the user takes the vehicle to the maintenance factory and the like, the maintenance engineer needs to perform an unnecessary zero-point adjustment, which may result in increasing hours relating to the maintenance.

A need thus exists to provide a load sensing device which is not susceptible to the drawback mentioned above.

SUMMARY

According to an aspect of this disclosure, a load sensing device, which includes a load detecting device adapted to a seat and outputting a load signal in response to a strain generated at the load detecting device and which detects a load applied to the seat on the basis of the load signal outputted from the load detecting device, the load sensing device includes a determining means determining whether the seat is in an occupied state or in a vacant state on the basis of a magnitude relationship between the detected load and a threshold value, a collision detecting means detecting a shock generated when a vehicle collides, an alarming device alarming that the shock is detected by the collision detecting means, and a memorizing means storing therein a diagnosis information indicating whether or not a zero-point adjustment of the load detecting device needs to be executed in response to a determination result of whether the seat is in the occupied state or in the vacant state obtained by the determining means in the case where the shock is detected by the load detecting member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
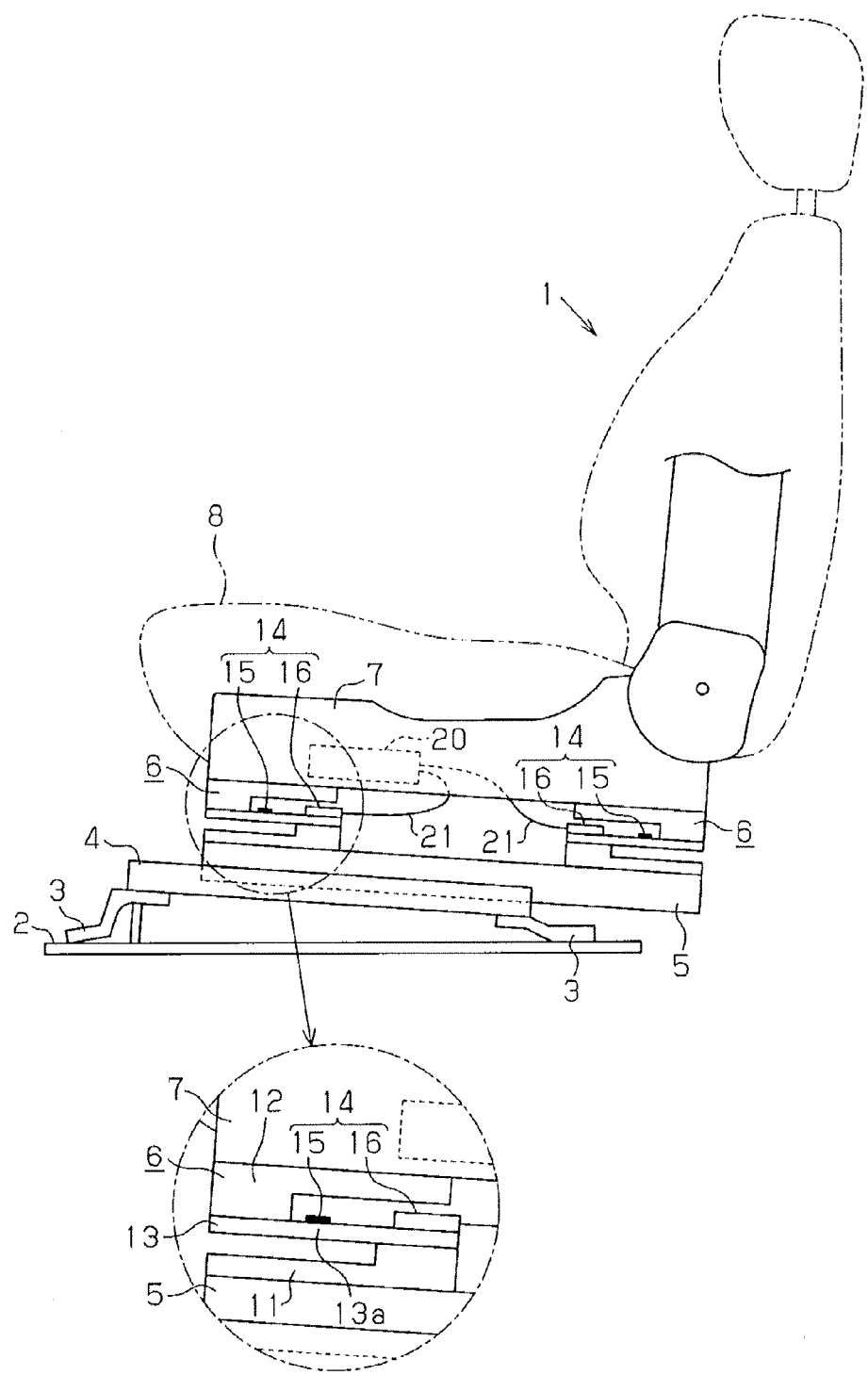
FIG. 1 is a side view illustrating a frame of a seat main body, to which a load sensing device according to an embodiment is adapted.

An embodiment of a load sensing device will be described below with reference to the attached drawings. Illustrated in FIG. 1 is a side view of a frame portion of a seat 1, which is mounted on a vehicle such as an automobile and the like as, for example, a passenger seat. Additionally, the frame portion illustrated in FIG. 1 is one of a pair of frame portions that are arranged so as to keep a distance therebetween in a width direction of the seat 1 (i.e. in a direction orthogonal to a paper of FIG. 1). More specifically, the frame portion illustrated in FIG. 1 is one of the frame portions arranged at a left side of the seat 1 so as to face a front portion of a vehicle and is viewed from an outside of the seat 1. The frame portion arranged at a right side of the seat 1 is configured similarly to the frame portion arranged at the left side. Therefore, an explanation about the seat 1 will be given with reference to the frame portion arranged at the left side of the seat 1.

As illustrated in FIG. 1, a pair of brackets 3 are fixed on an upper surface of a vehicle floor 2 so as to be arranged away from each other in a front-rear direction of the vehicle. A lower rail 4 is supported by the brackets 3 along the vehicle floor 2, so that the lower rail 4 is fixed on the vehicle floor 2 so as to extend in the front-rear direction by means of the brackets 3. An upper rail 5 is provided at an upper portion of the lower rail 4 while being allowed to be movable in the front-rear direction of the vehicle.

A lower arm 7 is supported on an upper surface of the upper rail 5 via a pair of sensor main bodies 6, which are arranged away from each other in the front-rear direction, while keeping a predetermined distance from the upper surface of the upper rail 5. The lower arm 7 configures a frame of a seat cushion 8. Additionally, in this embodiment, two sensor main bodies 6 are also provided at the frame portion arranged at the right side of the seat 1, so that four sensor main bodies 6 in total are provided at the seat 1.

As illustrated in an enlarged diagram in FIG. 1, each of the sensor main bodies 6 includes a first bracket 11, a second bracket 12, a plate 13 (which serves as a strain generating body), and a load sensor 14, which serves as a load detecting device. The load sensor 14 includes a strain gauge 15 and a signal processing device 16. For example, the sensor main body 6, which is provided at a front end portion of the upper rail 5 in the front-rear direction, is configured so that the first bracket 11 is fixed on an upper surface of the front end portion of the upper rail 5 in the front-rear direction, and the second bracket 12 is fixed on a lower surface of a front end portion of the lower arm 7 in the front-rear direction. Similarly, the sensor main body 6, which is provided at a rear end portion of the upper rail 5 in the front-rear direction, is configured so that the first bracket 11 is fixed on the upper surface of the rear end portion of the upper rail 5 in the front-rear direction, and the second bracket 12 is fixed on the lower surface of a rear end portion of the lower arm 7 in the front-rear direction. The plate 13 is formed in a flat plate-shape. A first end portion of the plate 13 is fixed on an upper surface of the first bracket 11 and a second end portion of the plate 13 is fixed on a lower surface of the second bracket 12. Furthermore, the plate 13 includes a deformation portion 13a at an intermediate portion of the plate 13.

The strain gauge 15 of each load sensor 14 is attached on an upper surface of the deformation portion 13a. The signal processing device 16 is provided on an upper surface of the first end portion of the plate 13 supported by the first bracket 11. The plate 13 is provided at the sensor main body 6 so that the plate 13 is deformed about the first end portion thereof supported by the first bracket 11 as a fulcrum when a load is applied to the plate 13 from the second bracket 12 in an up-and-down direction of the seat 1. The strain gauge 15 generates a gauge voltage as a load signal in response to a strain (a level of the strain) generated at the plate 13 (i.e. the deformation portion 13a) when being deformed. Fundamentally, the gauge voltage linearly fluctuates in response to the load applied to the seat 1. The signal processing device 16, for example, obtains an occupant mass detecting information corresponding to the load applied to the seat 1 on the basis of the gauge voltage.

An electronic control unit 20 (which will be hereinafter referred to as an ECU 20) is supported at the lower arm 7. The ECU 20 is connected to each of the load sensor 14 (the signal processing device 16) provided at each of all (four) of sensor main bodies 6 via a signal line 21 so as to be digitally duplex. The ECU 20 receives signals, which are obtained by the load sensors 14 and which correspond to the occupant mass detecting information, and then, the ECU 20, for example, detects whether or not an occupant is seated on the seat 1 (i.e. an occupant determination).

Figure 2:
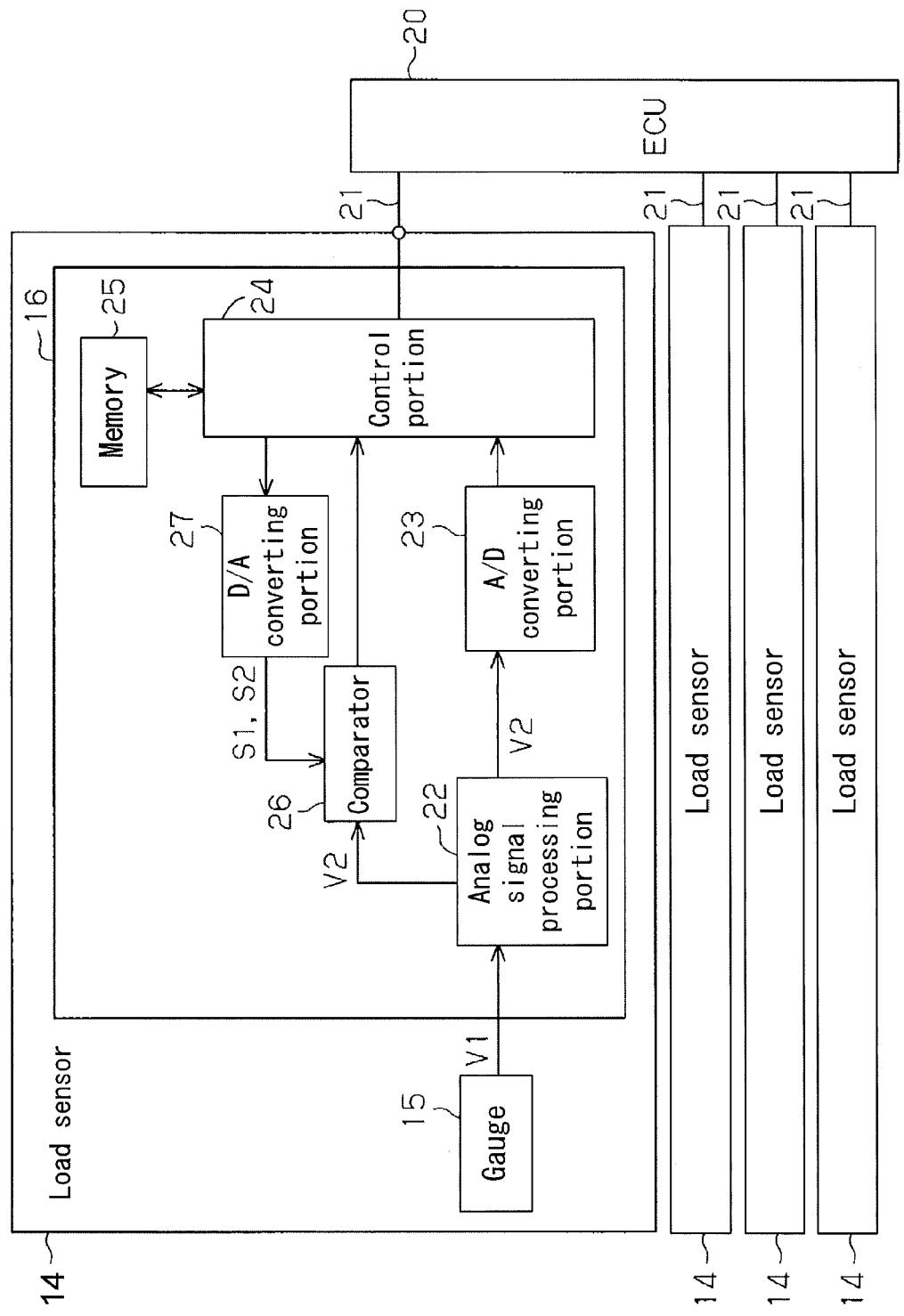
FIG. 2 is a block diagram illustrating an electric configuration of a load sensor.

An electric configuration of each of the load sensors 14 and an electric configuration of the ECU 20 will be described below with the block diagrams of FIGS. 2 and 3, respectively. As illustrated in FIG. 2, the signal processing device 16 of each of the load sensors 14 includes an analog signal processing portion 22, an analog-to-digital converting portion 23 (which will be hereinafter referred to as an A/D converting portion 23), a control portion 24 including a logic circuit, a rewritable and nonvolatile memory 25, which is configured with an electrically erasable programmable ROM (EEPROM) and the like, a comparator 26 and a digital-to-analog converting portion 27 (which will be hereinafter referred to as a D/A converting portion 27). Furthermore, the signal processing device 16 of each of the load sensors 14 is connected to the ECU 20 at the control portion 24 via the corresponding signal line 21. The control portion 24 executes operations such as receiving and transmitting various signals from and to the ECU 20, writing and reading out various information (data) relative to the memory 25, and the like. Additionally, the various signals are transmitted between the control portion 24 and the ECU 20 (a central processing unit (CPU) 31) at every predetermined time T.

The strain gauge 15 generates a gauge voltage V1 in response to the strain (the level of strain) generated when the load is applied to the seat 1. Then, the strain gauge 15 outputs the gauge voltage V1 to the analog signal processing portion 22. The analog signal processing portion 22 amplifies the gauge voltage V1 in order to generate a load detecting voltage V2. Then, the analog signal processing portion 22 outputs the load detecting voltage V2 to each of the A/D converting portion 23 and the comparator 26.

The A/D converting portion 23 executes an analog-to-digital conversion to the load detecting voltage V2 in order to generate an occupant mass detecting information signal. When the occupant mass detecting information signal is inputted into the control portion 24, the occupant mass detecting information signal is written and stored in the memory 25 as the occupant mass detecting information. Accordingly, each of the load sensors 14 obtains the occupant mass detecting information. Furthermore, the occupant mass detecting information is updated and the newly obtained occupant mass detecting information is stored in the memory 25 at a timing when the occupant mass detecting information is obtained by the control portion 24.

A high threshold value signal S1 and a low threshold value signal S2 are outputted from the D/A converting portion 27 to the comparator 26. More specifically, a predetermined high collision detecting threshold value and a predetermined low collision detecting threshold value, which is set to be smaller than the high collision detecting threshold value, are stored in the memory 25, so that the control portion 24 reads the high collision detecting threshold value and the low collision detecting threshold value in order to generate a high threshold value information signal and a low threshold value information signal, respectively. The control portion 24 outputs the high threshold value information signal and the low threshold value information signal to the D/A converting portion 27. The D/A converting portion 27 executes a digital-to-analog conversion to the high threshold value information signal and the low threshold value information signal in order to generate the high threshold value signal S1 and the low threshold value signal S2, respectively. Then, the D/A converting portion 27 outputs the high threshold value signal S1 and the low threshold value signal S2 to the comparator 26.

The comparator 26 compares the load detecting voltage V2 on the one hand and the high threshold value signal S1 and the low threshold value signal S2 on the other hand, so that the comparator 26 outputs a signal having a level (high or low) corresponding to a comparison result to the corresponding control portion 24. The high threshold value signal S1 and the low threshold value signal S2 based on the high collision detecting threshold value and the low collision detecting threshold value, respectively, are set to have appropriate levels suitable for detecting a shock generated when the vehicle collides. Accordingly, the level of the output signal from each comparator 26 fluctuates depending on whether or not the shock generated when the vehicle collides is detected.

Figure 4:
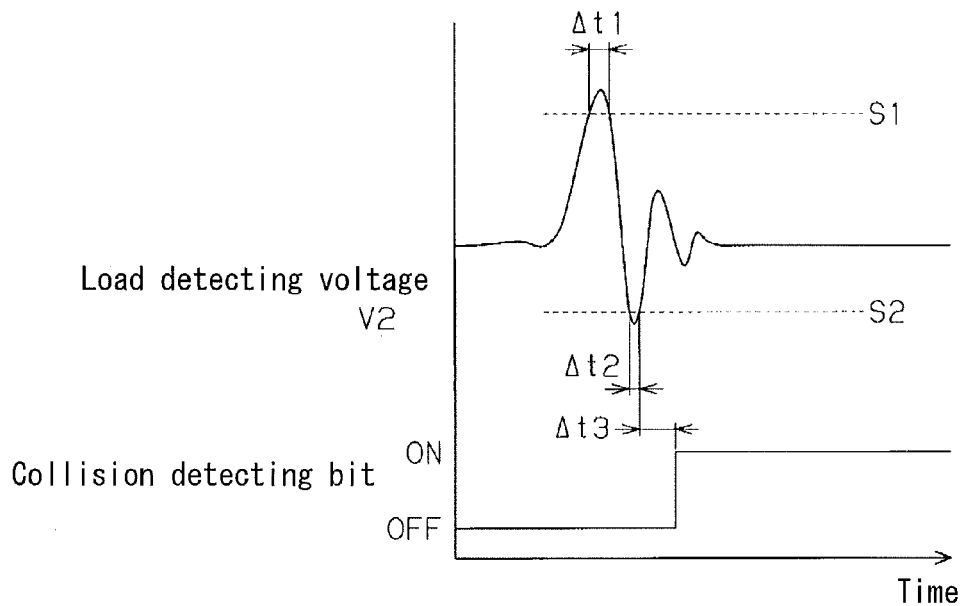
FIG. 4 is a time chart illustrating a shift of a load detecting voltage and a collision detecting bit when a collision occurs.

As illustrated in FIG. 4, when the vehicle collides, generally, the load detecting voltage V2 (the load applied on the seat 1) once suddenly increases and then, suddenly decreases. Accordingly, when the vehicle collides, the comparator 26 of each of the load sensors 14 generates an output signal having a level indicating that the load detecting voltage V2 exceeds the high threshold value signal S1. Then, the comparator 26 of each of the load sensors 14 generates an output signal having a level indicating that the load detecting voltage V2 falls below the low threshold value signal S2. The control portion 24 monitors a shift of the output signals from the corresponding comparator 26 of each of the load sensors 24 in order to detect the shock generated when the vehicle collides (i.e. a collision detecting means). Then, the control portion 24 writes the shock, which is generated when the vehicle collides, as a collision detecting bit in the memory 25 at the timing when various signals are transmitted between the ECU 20 and the control portion 24, so that the memory 25 stores therein the collision detecting bit. The collision detecting bit is information that is set as a high level when the shock generated when the vehicle collides is detected in the above-mentioned manner. Accordingly, the shock generated when the vehicle collides is detected by the load sensors 14.

When the control portion 24 of each of the load sensors 14 receives an information requiring signal from the ECU 20, the control portion 24 reads the occupant mass detecting information and the collision detecting bit, which are stored in the memory 25, in order to generate an information response signal for transmission having a predetermined transmission format. Then, the control portion 24 of each of the load sensors 14 transmits the information response signal to the ECU 20.

Figure 3:
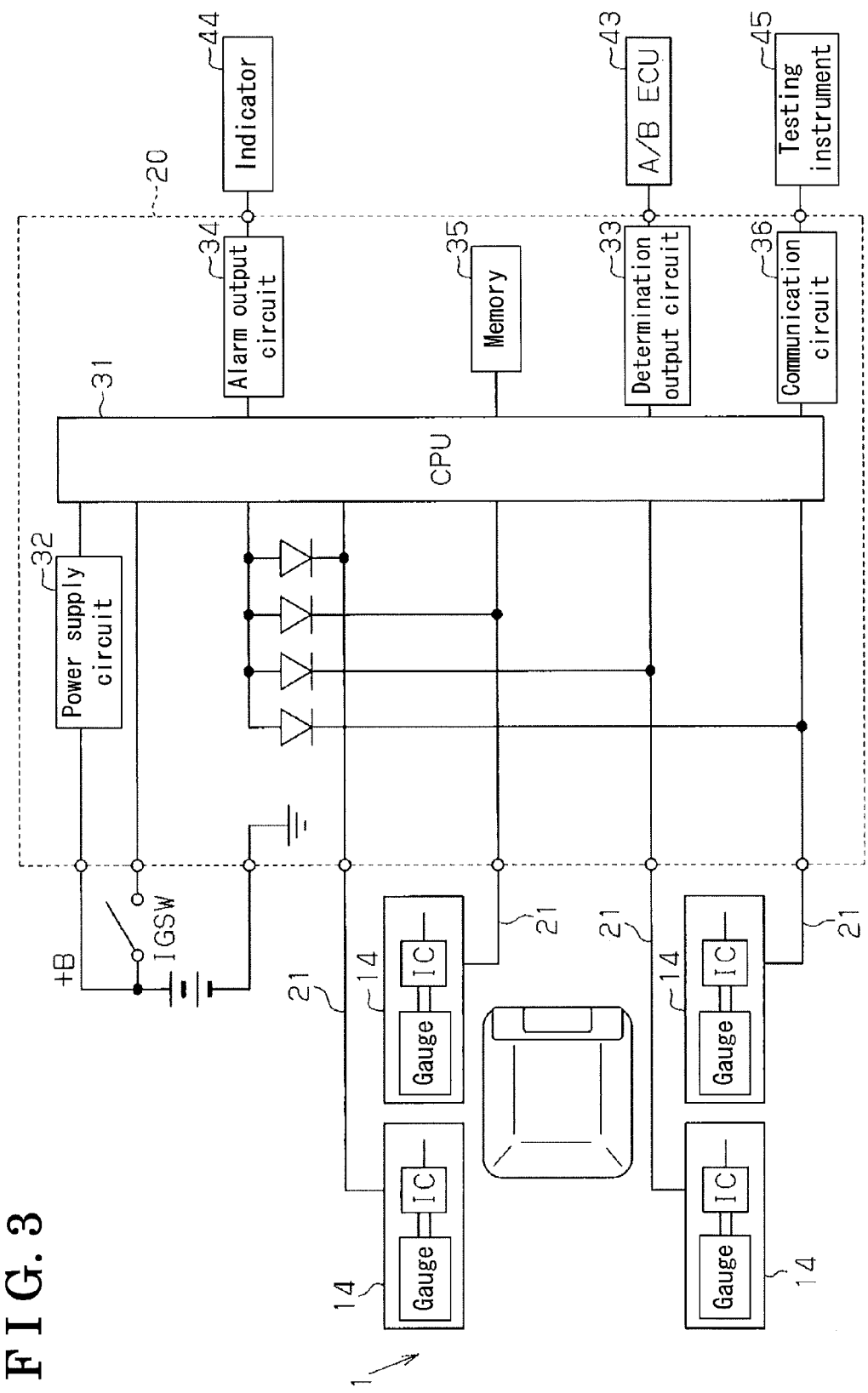
FIG. 3 is a block diagram illustrating an electric configuration of an electric control unit.

As illustrated in FIG. 3, the ECU 20 includes the CPU 31, a power supply circuit 32, a determination output circuit 33, an alarm output circuit 34, a rewritable and nonvolatile memory 35 (i.e. a memorizing means), which is configured with, for example, an electrically erasable programmable ROM (EEPROM) and the like, and a communication circuit 36. The ECU 20 is configured so as to be connected to each of all of the load sensors 14 (i.e. the control portions 24) separately to and independently of each other via the corresponding signal line 21 at the CPU 31. Additionally, the CPU 31 includes a read-only memory (ROM), which stores therein various programs, maps and the like, and a random-access memory (RAM), which is configured so as to read and write various data therefrom and therein.

The CPU 31 outputs the information requiring signal to the control portion 24 of each load sensor 14 in a case where the occupant determination and the like is executed. In this case, each control portion 24 reads the occupant mass detecting information and the collision detecting bit, which are stored in the memory 25, when each control portion 24 receives the information requiring signal from the CPU 31 in order to generate the information response signal for transmission. Then, each control portion 24 transmits the information response signal to the CPU 31. Accordingly, the CPU 31 receives the information response signal, which is generated by each load sensor 14 in response to the information requiring signal, in order to obtain the occupant mass detecting information and the collision detecting bit, which are included in the information response signal.

Then, the CPU 31 calculates a load information of the seat 1 (i.e. information relating to the load applied to the seat 1) in a manner where the CPU 31 sums up the obtained occupant mass detecting information from the load sensors 14 in order to execute the occupant determination (an occupant detection) on the basis of the load information of the seat 1. More specifically, the CPU 31 determines whether the seat 1 is in a vacant state or in an occupied state where an adult or a child is seated on the seat 1. Furthermore, the CPU 31 determines whether or not the shock is detected on the basis of the obtained collision detecting bits.

Additionally, the CPU 31 is connected to an airbag electronic control unit 43 (which will be hereinafter referred to as an airbag ECU 43) of an airbag apparatus via the determination output circuit 33. The CPU 31 outputs information relating to an occupant determination result and information, which relates to whether or not the collision is detected, to the airbag ECU 43 via the determination output circuit 33. The airbag ECU 43 appropriately controls an actuation of the airbag on the basis of the obtained information.

The CPU 31 is connected to, for example, an indicator 44, which is an example of an alarming device provided at an instrument panel and the like, via the alarm output circuit 34. The CPU 31 outputs a driving signal to the alarm output circuit 34 when the CPU 31 receives the collision detecting bit indicating that the shock is detected in order to actuate the indicator 44 to be lit. Accordingly, the occupant such as a driver and the like may be urged to take the vehicle to a maintenance factory such as a car dealership and the like.

Furthermore, the CPU 31 is configured so as to be connectable to a testing instrument 45 via the communication circuit 36. The testing instrument 45 is a tool for testing the load sensors 14 and the like, for example, when being repaired at the maintenance factory such as the car dealership and the like. More specifically, the CPU 31 executes a predetermined testing process when the CPU 31 receives a predetermined inspection requiring signal from the testing instrument 45 via the communication circuit 36. Then, the CPU 31 outputs the test result to the testing instrument 45.

Additionally, the CPU 31 compares, for example, the load corresponding to the load information of the seat 1 with the threshold value in order to determine whether the seat 1 is in the occupied state or the vacant state, which is used for determining a necessity of a zero-point adjustment of each load sensor 14 in the case where the collision of the vehicle is detected (i.e. a determining means). Then, the determination result (i.e. whether the seat 1 is in the occupied state or the vacant state) is stored in the RAM of the CPU 31 as a seating state in a collision-determining information. Accordingly, the seating state in the collision-determining information is updated and the updated seating state in the collision-determining information is stored in the RAM at the timing when various signals are transmitted between the control portion 24 (i.e. each load sensor 14) and the CPU 31.

Figure 5:
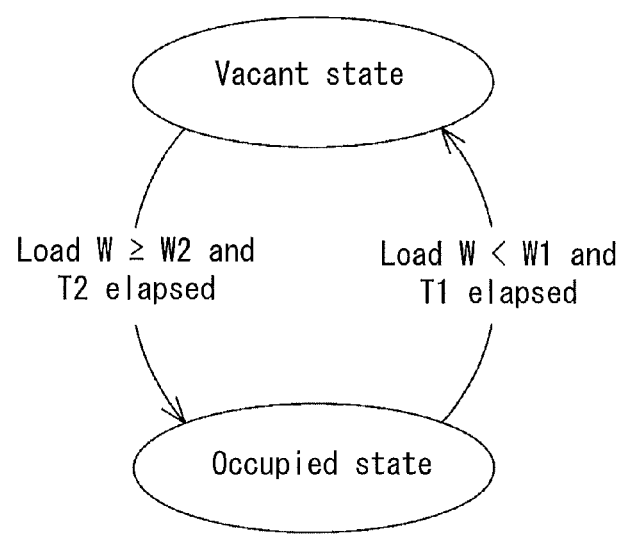
FIG. 5 is a diagram for explaining a shift in a seating state in a collision-determining information between an occupied state and a vacant state.

A shift (a switching) of a determination between the occupied state and the vacant state by the CPU 31 (i.e. a shift of the seating state in the collision-determining information) will be described below with reference to FIG. 5. As illustrated in FIG. 5, in a case where the seating state in the collision-determining information currently indicates the occupied state, the CPU 31 shifts the seating state in the collision-determining information to the vacant state in a case where a state that the load W corresponding to the load information of the seat 1 being smaller than a first threshold value W1 continues for a predetermined first time T1. On the other hand, in a case where the seating state in the collision-determining information currently indicates the vacant state, the CPU 31 shifts the seating state in the collision-determining information to the occupied state in a case where a state that the load W being equal to or greater than a second threshold value W2, which is set to be greater than the first threshold value W1, continues for a predetermined second time T2. Accordingly, the first threshold value W1 and the second threshold value W2 are set to have different values, so that the shift of the seating state in the collision-determining information between the occupied state and the vacant state does not frequently occur in order to avoid the frequent shift of the seating state in the collision-determining information between the occupied state and the vacant state, which occurs when the load W slightly fluctuates in proximity to a threshold value (i.e. the first threshold value W1 or the second threshold value W2). Furthermore, the CPU 31 is configured so as not to shift the seating state in the collision-determining information between the occupied state and the vacant state until the above-mentioned magnitude relationship between the load W and the threshold value (i.e. the first threshold value W1 or the second threshold value W2) continues for the predetermined time (i.e. the first time T1 or the second time T2) (i.e. a delay means) in order to avoid the frequent shift of the seating state in the collision-determining information between the occupied state and the vacant state, which occurs when the load W temporarily fluctuates.

In the case where the CPU 31 obtains the collision detecting bit, which indicates that the collision of the vehicle is detected, the CPU 31 sets a collision detecting diagnosis Dia as a diagnostic information indicating the necessity of the zero-point adjustment of each load sensor 14 in response to the seating state in the collision-determining information. Then, the CPU 31 stores the collision detecting diagnosis Dia in the memory 35. More specifically, in the case where the seating state in the collision-determining information indicates the occupied state when the CPU 31 receives the collision detecting bit indicating that the collision of the vehicle is detected, the CPU 31 stores the collision detecting diagnosis Dia indicating that the zero-point adjustment needs to be executed to each load sensor 14 in the memory 35. On the other hand, in the case where the seating state in the collision-determining information indicates the vacant state when the CPU 31 receives the collision detecting bit indicating that the collision of the vehicle is detected, the CPU 31 stores the collision detecting diagnosis Dia indicating that the zero-point adjustment does not need to be executed to each load sensor 14 in the memory 35. Generally, in the case where specifically the seat 1 is in the vacant state, a moment is not generated at the seat 1 via a buckle of a seat belt even if the shock is generated when the vehicle collides, therefore, a likelihood of an occurrence of a significant zero-point displacement at the gauge voltage V1 of the strain gauge 15 (i.e. the occupant mass detecting information of each load sensor 14) is reduced. Hence, in the case where the seat 1 is in the vacant state when the vehicle collides, the collision detecting diagnosis Dia indicating that the zero-point adjustment does not need to be executed to each load sensor 14 is stored in the memory 35.

Accordingly, a maintenance engineer of the maintenance factory, to which the vehicle is taken by the occupant such as the driver and the like (e.g. a user or owner of the vehicle) in response to the shock detection (i.e. an alarm of the indicator 44), may check the necessity of the zero-point adjustment of each load sensor 14 by reading out the collision detecting diagnosis Dia stored in the memory 35 by means of the testing instrument 45. In a checking process performed by the maintenance engineer, in the case where the collision detecting diagnosis Dia indicates that the zero-point adjustment is not necessary, the maintenance engineer does not need to perform an operation relating to the zero-point adjustment of each load sensor 14 (e.g. a reset of the zero-point, a sensitivity test to be executed thereafter and the like).

Figure 6A:
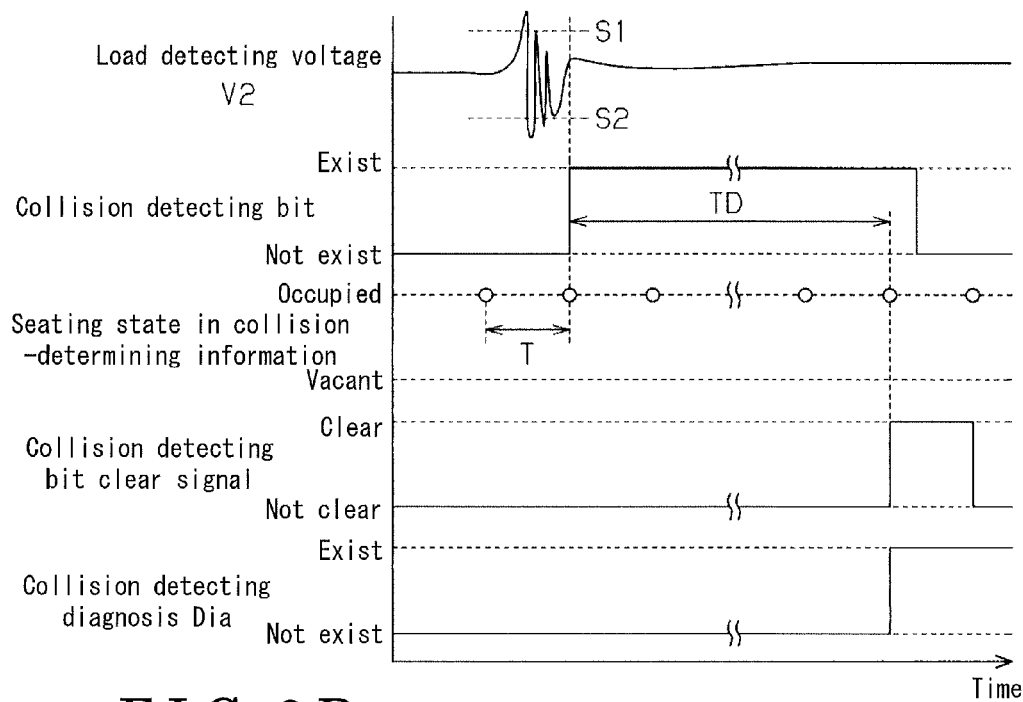
FIG. 6A and FIG. 6B are time charts illustrating setting examples of a collision detecting diagnosis.
Figure 6B:
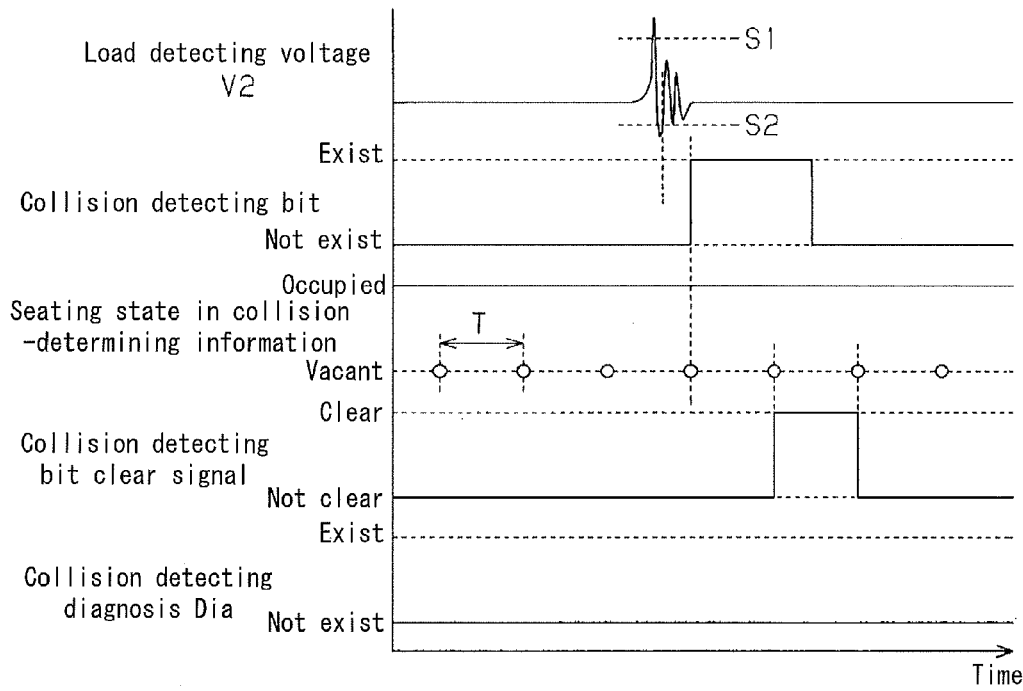

Illustrated in FIGS. 6A and 6B are time charts indicating shifts of the load detecting voltage V2 and the collision detecting bit of each load sensor 14, the seating state in the collision-determining information (i.e. either the occupied state or the vacant state) of the ECU 20, and a collision detecting bit clear signal and the collision detecting diagnosis Dia. Additionally, the collision detecting bit clear signal is witched from a low level to a high level at a timing relating to the transmission of (receiving and sending) the seating state in the collision-determining information when the collision detecting bit is shifted from a low level to a high level. Furthermore, the collision detecting bit clear signal is shifted from the high level to the low level at the next timing relating to the transmission of the seating state in the collision-determining information.

Illustrated in FIGS. 6A and 6B are the time charts formed on the assumption that the load detecting voltage V2 once suddenly increases due to the shock generated when, for example, the vehicle collides and the like, and then, the load detecting voltage V2 suddenly decreases thereafter. In other words, as illustrated in FIG. 4, the time charts illustrated in FIGS. 6A and 6B are formed on the assumption that a time $\Delta t1$ during which the load detecting voltage V2 exceeds the high threshold value signal S1 has elapsed, and then, a time $\Delta t2$ during which the load detecting voltage V2 falls below the low threshold value signal S2 has elapsed. In this case, the control portion 24 of each load sensor 14 switches the collision detecting bit from the low level to the high level when a time $\Delta t3$, which corresponds to the next timing of the transmission of the various signals between the control portion 24 and the ECU 20, has elapsed.

As illustrated in FIGS. 6A and 6B, in the case where the CPU 31 of the ECU 20 detects the switching of the collision detecting bit at the timing when the various signals are transmitted between the control portions 24 and the ECU 20, the CPU 31 checks the seating state in the collision-determining information determined in the previous timing when the various signals are transmitted between the control portions 24 and the ECU 20. In this embodiment, the previous timing when the various signals are transmitted between the control portions 24 and the ECU 20 is used in order to avoid a use of the seating state in the collision-determining information on the basis of the occupant mass detecting information obtained while the load detecting voltage V2 suddenly changes. The predetermined time T is set to have enough time duration for the load detecting voltage V2 to converge.

As illustrated in FIG. 6A, in the case where the previously checked seating state in the collision-determining information indicates the occupied state, the CPU 31 shifts the collision detecting diagnosis Dia from the low level to the high level at the transmission timing (i.e. the timing when the various signals are transmitted between the control portions 24 and the ECU 20) when a predetermined time TD, which is set to be long enough relative to the predetermined time T, has elapsed. Then, the CPU 31 stores the level of the collision detecting diagnosis Dia in the memory 35. Simultaneously, the CPU 31 shifts the collision detecting bit clear signal from the low level to the high level at the transmission timing when the predetermined time TD has elapsed. In this embodiment, the level of the collision detecting diagnosis Dia and the like is shifted after the predetermined time TD has elapsed in order to eliminate an influence of a temporal rise of the collision detecting bit occurring due to a noise and the like. On the other hand, in this embodiment, the control portion 24 of each load sensor 14 is configured so as to shift (return) the collision detecting bit from the high level to the low level in the case where the control portion 24 detects the shift of the level of the collision detecting bit clear signal to the high level.

In this case, the maintenance engineer at the maintenance factory confirms that the collision detecting diagnosis Dia is at the high level in the manner where the collision detecting diagnosis Dia stored in the memory 35 is read out by the testing instrument 45, in other words, the maintenance engineer confirms the necessity of the zero-point adjustment of each load sensor 14. Accordingly, the maintenance engineer performs the operation relating to the zero-point adjustment.

Furthermore, as illustrated in FIG. 6B, in the case where the previously checked seating state in the collision-determining information indicates the vacant state, the CPU 31 promptly shifts the collision detecting bit clear signal from the low level to the high level at the next transmitting timing while maintaining the collision detecting diagnosis Dia at the low level. On the other hand, as described above, the control portion 24 of each load sensor 14 shifts (returns) the collision detecting bit from the high level to the low level in the case where the control portion 24 detects the shift of the level of the collision detecting bit clear signal to the high level.

In this case, the maintenance engineer confirms that the collision detecting diagnosis Dia is at the low level in the manner where the collision detecting diagnosis Dia stored in the memory 35 is read out by means of the test instrument 45, in other words, the maintenance engineer confirms that the zero-point adjustment of each load sensor 14 is not necessary. Accordingly, the maintenance engineer does not need to perform the operation relating to the zero-point adjustment of each load sensor 14.

Each control process executed by the CPU 31 of the ECU 20 will be described below with reference to flowcharts in FIGS. 7 and 8. Firstly, the shift of the determination result by the CPU 31 between the occupied state and the vacant state (i.e. shift of the seating state in the collision-determining information) will be described. This process is repeatedly executed each timing when various signals are transmitted between the CPU 31 and the control portion 24 of each sensor 14 (i.e. every predetermined time T).

Figure 7:
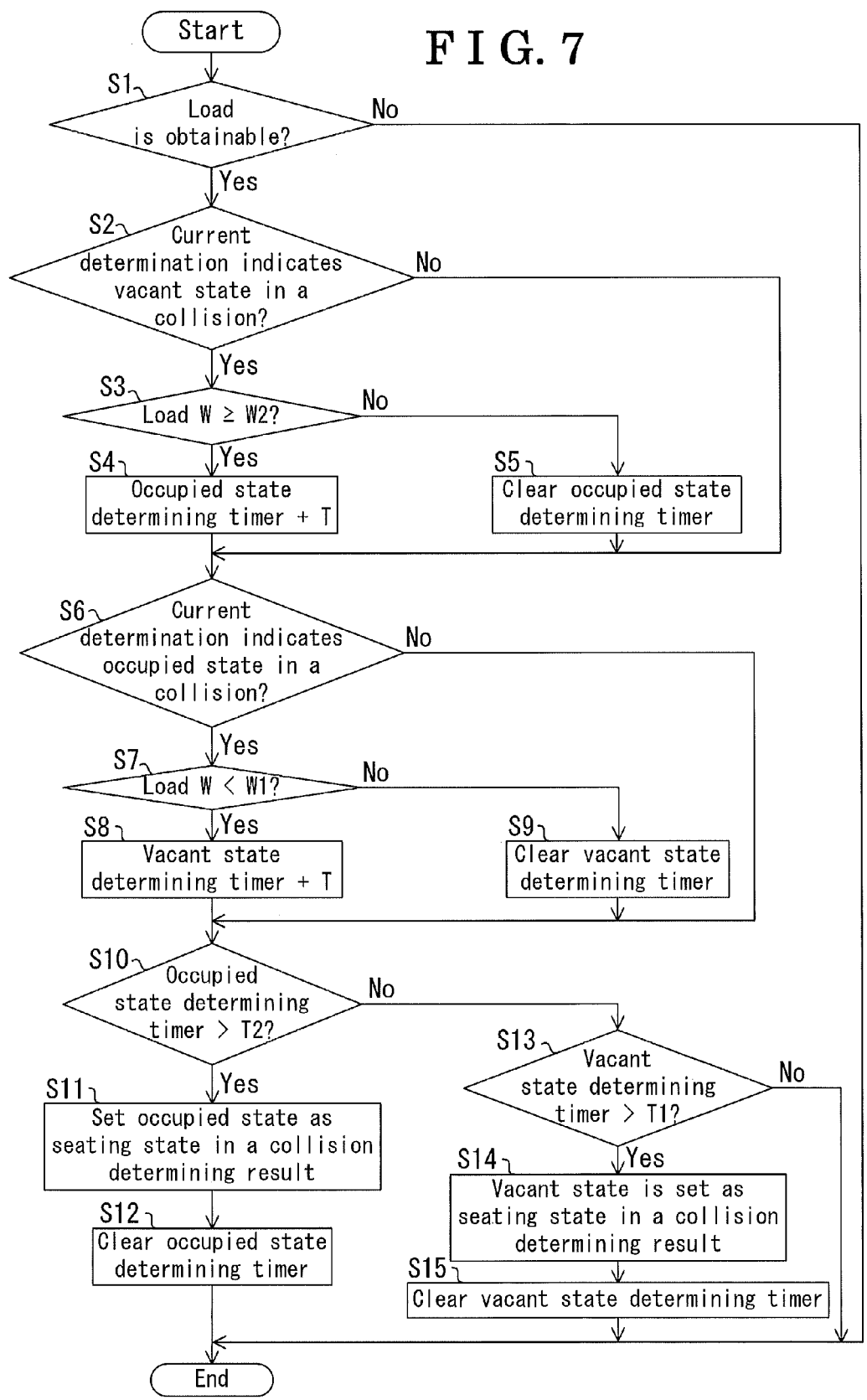
FIG. 7 is a flowchart illustrating a shifting process of the seating state in the collision-determining information between the occupied state and the vacant state.

As illustrated in FIG. 7, the CPU 31 of the ECU 20 firstly determines whether or not the occupant mass detecting information is obtainable from all of the load sensors 14 (step S1). In a case where the occupant mass detecting information is determined to be not obtainable from any one of the load sensors 14 (No in step S1), the following steps are omitted and the process is once terminated. On the other hand, in a case where the CPU 31 determines that the occupant mass detecting information is obtainable from all of the load sensors 14 (Yes in step S1), the CPU 31 determines whether or not the current seating state in the collision-determining information indicates the vacant state (step S2).

In a case where the CPU 31 determines that the current seating state in the collision-determining information indicates the vacant state in step S2 (Yes in step S2), the CPU 31 of the ECU 20 determines whether or not the load W, which corresponds to the load information of the seat 1 obtained by adding all of the occupant mass detecting information from all of the load sensors 14, is equal to or greater than the second threshold value W2 (step S3). In a case where the CPU 31 determines that the load W is equal to or greater than the second threshold value W2 (Yes in step S3), the CPU 31 considers that the load W indicates the occupied state. Then, the CPU 31 increments an occupied state determining timer TMo by the predetermined time T corresponding to a calculation cycle (step S4). On the other hand, in a case where the CPU 31 determines that the load W is lower than the second threshold value W2 (No in step S3), the CPU 31 considers that the load W indicates the vacant state. Then, the CPU 31 clears (resets) the occupied state determining timer TMo to zero (0) (step S5). The occupied state determining timer TMo times a duration time where the state of the load W indicating a level of the load W to be reached while the seat 1 is in the occupied state is continued.

In the case where the process in step S4 or step S5 is completed, or in the case where the current seating state in the collision-determining information does not indicate the vacant state in step S2, the CPU 31 determines whether or not the current seating state in the collision-determining information indicates the occupied state (step S6).

In a case where the CPU 31 determines that the current seating state in the collision-determining information indicates the occupied state (Yes in step S6), the CPU 31 determines whether or not the load W is smaller than the first threshold value W1 (step S7). Then, in the case where the load W is determined to be smaller than the first threshold value W1, the CPU 31 considers that the load W indicates the level of the load W to be reached when the seat 1 is in the vacant state, and the CPU 31 increments a vacant state determining timer TMv by the predetermined time T corresponding to the calculation cycle (step S8). On the other hand, in a case where the CPU 31 determines that the load W is equal to or greater than the first threshold value W1 (No in step S6), the CPU 31 considers that the load W indicates the level of the load W to be reached when the seat 1 is in the occupied state and clears (resets) the vacant state determining timer TMv to zero (0) (step S9). The vacant state determining timer TMv times a duration time where the state of the load W indicating the level of the load W to be reached when the seat 1 is in the vacant state is continued.

In the case where the process in step S8 or step S9 is completed, or in the case where the current seating state in the collision-determining information does not indicate the occupied state in step S6, the CPU 31 determines whether or not the occupied state determining timer TMo exceeds the second time T2 (step S10). Then, in a case where the CPU 31 determines that the occupied state determining timer TMo exceeds the second time T2 (Yes in step S10), the CPU 31 considers that the seating state of the seat 1 is stabilized at the occupied state, so that the seating state in the collision-determining information is set to the occupied state (step S11). Then, the occupied state determining timer TMo is cleared to zero (0) (step S12).

On the other hand, in a case where the CPU 31 determines that the occupied state determining timer TMo does not exceed the second time T2 in step S10 (No in step S10), the CPU 31 determines whether or not the vacant state determining timer TMv exceeds the first time T1 (step S13). Then, in a case where the CPU 31 determines that the vacant state determining timer TMv exceeds the first time T1 (Yes in step S13), the CPU 31 determines that the seating state of the seat 1 is stabilized at the vacant state and sets the seating state in the collision-determining information to the vacant state (step S14). Following step S14, the CPU 31 clears (resets) the vacant state determining timer TMv to zero (0) (step S15).

In the case where the process in step S12 or the process in step S15 is completed, or in a case where the CPU 31 determines that the vacant state determining timer TMv does not exceed the first time T1 in step S13 (No in step S13), the following steps are omitted and the process is once terminated. Accordingly, the seating state in the collision-determining information is shifted to the vacant state in the case where the load W being smaller than the first threshold value W1 continues for the first time T1 while the current seating state in the collision-determining information indicates the occupied state. Alternatively, the seating state in the collision-determining information is shifted to the occupied state in the case where load W being equal to or greater than the second threshold value W2 continues for the second time T2 while the current seating state in the collision-determining information indicates the vacant state.

An example of setting of the collision detecting diagnosis Dia by the CPU 31 of the ECU 20, i.e. an example of setting of diagnosis indicating whether or not the zero-point adjustment needs to be executed to each load sensor 14, will be described below. This process is repeatedly executed every predetermined timing when the various signals are transmitted between the CPU 31 of the ECU 20 and the control portion 24 of each load sensor 14 (i.e. the predetermined time T).

Figure 8:
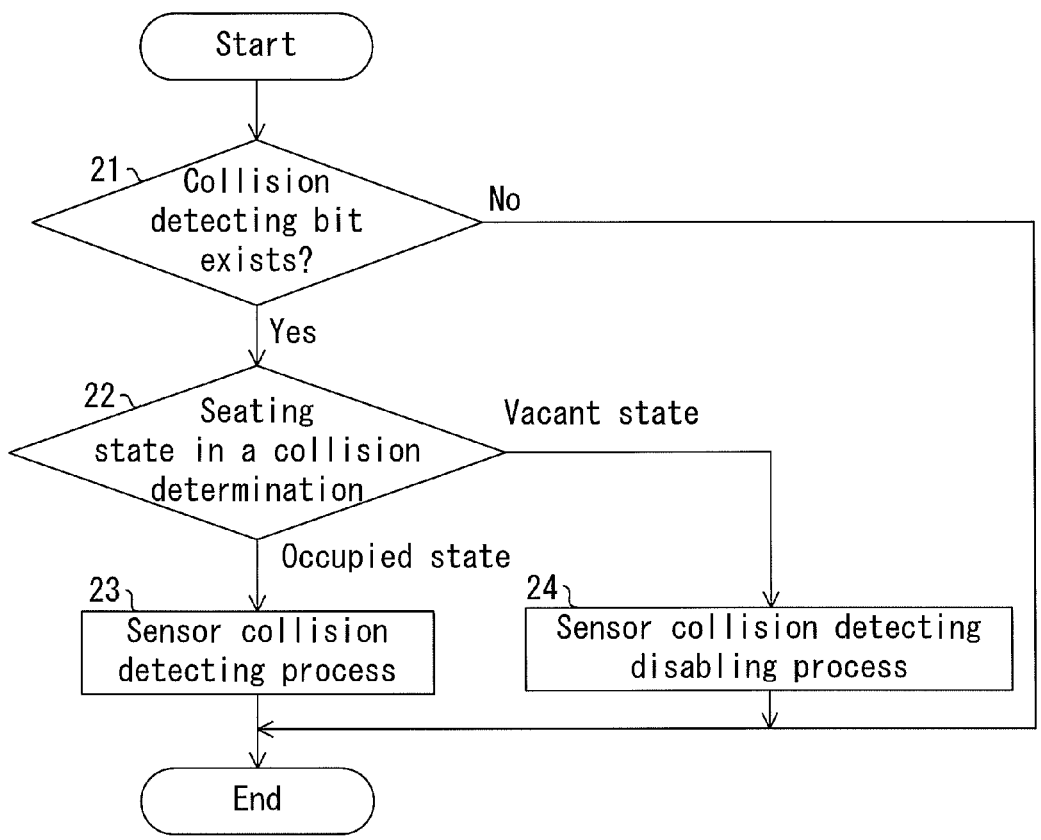
FIG. 8 is a flowchart illustrating a setting process of the collision detecting diagnosis.

As illustrated in FIG. 8, in a setting process of the collision detecting diagnosis Dia, the CPU 31 determines whether the collision detecting bit is transmitted thereto from the control portion 24 of each load sensor 14 (i.e. whether or not the collision detecting bit is in the high level) (step S21). In a case where the CPU 31 determines that the collision detecting diagnosis Dia is not transmitted thereto from the control portion 24 of each load sensor 14 (No in step S21), the following steps are omitted and the process is once terminated. On the other hand, in a case where the CPU 31 determines that the collision detecting bit is transmitted thereto from the control portion 24 of each load sensor 14 (Yes in step S21), the CPU 31 determines whether the seating state in the collision-determining information at the previous timing when various signals are transmitted between the ECU 20 and the load sensors 14 indicates the occupied state or the vacant state (step S22).

In a case where the CPU 31 determines that the seating state in the collision-determining information indicates the occupied state in step S22, the CPU 31 executes a sensor collision detecting process (step S23). More specifically, the collision detecting diagnosis Dia is shifted from the low level to the high level in the above-described manner and the shifted collision detecting diagnosis Dia is stored in the memory 35. On the other hand, in a case where the CPU 31 determines that the seating state in the collision-determining information indicates the vacant state in step S22, the CPU 31 executes a sensor collision determination disabling process (step S24). More specifically, in this case, the collision detecting diagnosis Dia, which remains in the low level, is stored in the memory 35.

After the process in response to the seating state in the collision-determining information (e.g. step S23 or step S24) is completed, the following steps are omitted and the process is terminated. In this case, the collision detecting diagnosis setting process is not allowed to be executed at the next timing of transmitting various signals between the ECU 20 and the load sensors 14. Accordingly, the collision detecting diagnosis Dia is not changed until the user of the vehicle takes the vehicle to the maintenance factory for maintenance, because in the case where the above-mentioned shock is generated even just once, a reliability of the apparatus (i.e. the load sensors 14, the ECU 20 and the like) may be decreased. In the case where the collision detecting bit is detected in step S21, the indicator 44 is actuated to be lit without being influenced by the seating state in the collision-determining information, as described above.

As described above, the following advantages and merits may be achieved by the load sensing device. According to the embodiment, the seating state of the seat 1 is determined whether to be in the occupied state or the vacant state on the basis of the magnitude relationship between the load W and the threshold value (i.e. the first threshold value W1 and the second threshold value W2). In the case where the seat 1 is determined to be in the occupied state when the shock generated when the vehicle collides is detected, the diagnosis information indicating the necessity of the zero-point adjustment of each sensor 14 is stored in the memory 35. On the other hand, in the case where the seat 1 is determined to be in the vacant state when the shock generated when the vehicle collides is detected, the diagnosis information indicating unnecessity of the zero-point adjustment of each load sensor 14 is stored in the memory 35. Accordingly, in the case where the detection of the shock is informed to the occupant by means of the indicator 44 and the occupant takes the vehicle to the maintenance factory, the maintenance engineer may check the necessity of the zero-point adjustment of each load sensor 14 on the basis of the diagnosis information stored in the memory 35.

Accordingly, the maintenance engineer may not need to carry the operation relating to the zero-point adjustment in the case where the diagnosis information indicates that the zero-point adjustment of each load sensor 14 is not necessary. As a result, in this case, hours relating to the maintenance (i.e. the zero-point adjustment) may be reduced. Specifically, generally, even in a case where a passenger in a rear seat hits the seat 1 from behind while the seat 1 is in the vacant state or in a case where the passenger pushes a seat back and suddenly releases a pressure applied to the seat back while the seat 1 is in the vacant state, the shock may be detected (i.e. the alarm may be given to the passenger through the indicator 44). However, in those cases, the significant zero-point displacement is not likely to occur. According to the embodiment, the unnecessary zero-point adjustment in the above-mentioned cases may also be avoided.

Additionally, the shock may be detected (i.e. the alarm may be given through the indicator 44) in a case where an inspector at a manufacturing plant lightly hits the seat 1 while the seat 1 is in the vacant state in a process of, for example, a backlash check executed in a delivery inspection. The backlash check is executed in order to check a looseness of a bolt and the like after the seat 1 is assembled. In other words, in the backlash check, the inspector checks that the significant zero-point displacement, which is likely to occur when the vehicle collides, does not occur. Hence, even in this case, the unnecessary zero-point adjustment to be executed after the backlash check may be avoided.

According to the embodiment, the first threshold value W1, which is used as a threshold for shifting the seating state in the collision-determining information from the occupied state to the vacant state, and the second threshold value W2, which is used as a threshold for shifting the seating state in the collision-determining information from the vacant state to the occupied state, are set as different values from each other, so that the shift of the seating state in the collision-determining information between the occupied state and the vacant state may less likely to frequently occur. Accordingly, the frequent shift of the seating state in the collision-determining information between the occupied state and the vacant state occurring due to a slight fluctuation of the load W in proximity of the threshold value (i.e. the first threshold value W1 or the second threshold value W2) may be avoided.

According to the embodiment, the seating state in the collision-determining information is shifted between the occupied state and the vacant state in the case where the predetermined magnitude relationship between the load W and the threshold value (i.e. the first threshold value W1 or the second threshold value W2) continues for the predetermined time (i.e. the first time T1 or the second time T2). Accordingly, the frequent shift of the seating state in the collision-determining information between the occupied state and the vacant state occurring due to the temporal fluctuation of the load W may be avoided. Specifically, even if the load W unstably fluctuates because of an influence of a disturbance and the like, the frequent shift of the seating state in the collision-determining information between the occupied state and the vacant state may be further avoided.

According to the embodiment, the load sensing device is configured so that the shock generated when the vehicle collides is detected by using the load signal (i.e. the load detecting voltage V2) outputted from each strain gauge 15. Therefore, for example, a specific sensor for detecting the shock (e.g. an acceleration sensor) and the like does not need to be included at the load sensing device, which may result in reducing a number of components used for the load sensing device.

According to the embodiment, the load sensing device is configured so as to monitor the shifting state of the load detecting voltage in order to detect (and confirm) the shock generated when the vehicle collides in the case where the load detecting voltage V2 (i.e. a level of the load signal) exceeds the high threshold value signal S1 (i.e. a level indicating a high load) and then the load detecting voltage V2 falls below the low threshold value signal S2 (i.e. a level indicating a low load), in other words, in a case where the shifting state of the load detecting voltage V2 indicates a similar shift of the load detecting voltage V2 detected when the vehicle collides.

According to the embodiment, the setting of the collision detecting diagnosis Dia may be changed by changing a internal soft program of the ECU 20 (i.e. the CPU 31). Therefore, for example, the configuration of the signal processing device 16 does not need to be changed, which may result in reducing hours and costs relating to a development.

Additionally, the load sensing device according to the embodiment may be modified as follows. In the above-described embodiment, the shock generated when the vehicle collides is detected by using the shift of the load detecting voltage V2. However, the load sensing device may be modified so as to include a specific sensor (e.g. the acceleration sensor) and the like in order to detect the shock by the specific sensor and the like.

The load sensing device according to the embodiment may be modified so that the setting of the shock detecting diagnosis Dia and the like at the ECU 20 may be executed under a condition that the collision detecting bits of all of the load sensors 14 indicate the high level, or under a condition that the collision detecting bit of any one of the load sensors 14 indicates the high level.

The load sensing device according to the embodiment may be modified so that the seating state in the collision-determining information is promptly shifted between the occupied state and the vacant state when the magnitude relationship between the load W and the threshold value (i.e. the first threshold value W1 or the second threshold value W2) is shifted (reversed).

The load sensing device according to the embodiment may be modified so that the threshold values (i.e. the first threshold value W1 and the second threshold value W2), which are used as the thresholds for shifting the seating state in the collision-determining information between the occupied state and the vacant state, may be set to have the same level. Furthermore, a number of the load sensor 14 included at the load sensing device is not limited to four. For example, any desired natural number of the load sensor 14 may be included at the load sensing device.

The load sensing device according to the embodiment may be modified so that the strain gauge 15 is attached at a lower surface of each deformation portion 13a. The sensor main body 6 of the load sensing device according to the embodiment is an example, and any other configurations may be adapted as long as the load applied to the seat 1 is detectable.

The load sensing device according to the embodiment may be modified so that the seating state in the collision-determining information is used as the occupant determining information outputted to the airbag ECU 43. A technical idea conceivable from the above described embodiment and modified examples will be described below.

Each of the load sensors 14, which serves as the collision detecting device, is configured so as to detect the shock generated when the vehicle collides in the case where the level of the load signal exceeds the level indicating the predetermined high load and then the level of the load signal falls below the level indicating the predetermined low load. Generally, when the vehicle collides, the level of the load signal once suddenly increases and then suddenly decreases. The shift of the level of the load signal in the above-described manner occurs due to, for example, a natural oscillation (resonance) of the seat 1. According to the embodiment, each of the load sensors 14 monitors the shift of the level of the load signal in order to detect the shock generated when the vehicle collides in the case where the level of the load signal exceeds the level indicating the predetermined high load and falls below the level indicating the predetermined low load, in other words, in other words, in the case where the shift of the level of the load signal approximates to the shift of the load signal occurring when the vehicle collides.

According to the embodiment, the load sensing device, which includes the load sensors 14 adapted to the seat 1 and outputting the load signal in response to the strain generated at each of the load sensors 14 and which detects the load W applied to the seat 1 on the basis of the load signal outputted from each of the load sensors 14, the load sensing device includes the CPU 31 (the determining means) determining whether the seat 1 is in the occupied state or in the vacant state on the basis of the magnitude relationship between the detected load W and the threshold value (i.e. the first threshold value W1 or the second threshold value W2), the control portions 24 (the collision detecting means) detecting the shock generated when the vehicle collides, the indicator 44 alarming that the shock is detected by the control portion 24 of each load sensor 14, and the memory 35 storing therein the diagnosis information indicating whether or not the zero-point adjustment of each load sensor 14 needs to be executed in response to the determination result of whether the seat 1 is in the occupied state or in the vacant state obtained by the CPU 31 in the case where the shock is detected by each of the load sensors 14.

Generally, while the seat 1 is in the occupied state, the occupant uses the seat belt in order to secure his/her body on the seat 1, which may result in protecting the occupant from the shock generated when the vehicle collides. The seat belt secures the body of the occupant on the seat 1 in a manner where a tongue of the seat belt is fastened to the buckle fixed at the seat 1. Accordingly, in the case where the shock is generated due to the collision of the vehicle while the seat 1 is in the occupied state (i.e. while the occupant is seated on the seat 1), the shock generated at the seat 1 increases by a weight of the occupant seated on the seat 1 in addition to the shock generated by the collision of the vehicle. In other words, an impulse FT generated in this case is represented by the following formula:

$$FT=M*G*\Delta t$$

where "M" represents a mass of the occupant, "G" represents an acceleration speed when the vehicle collides and "Δt" represents a duration time where the acceleration speed G acts on the vehicle.

As represented by the above formula, in a case where the mass M increases and the shock (i.e. the impulse FT) increases, the moment acting on the seat 1 via the buckle becomes significant, which may result in, for example, plastically deforming the seat 1. In this case, the significant zero-point displacement may be highly likely to occur on the load signal outputted from each of the load sensors 14. On the other hand, in the case where the shock is generated due to the collision of the vehicle while the seat 1 is in the vacant state, at least, the above-mentioned moment is not likely to be generated. Therefore, the significant zero-point displacement is not likely to occur on the load signal outputted from each of the load sensors 14. Accordingly, the CPU 31 determines whether the seat 1 is in the occupied state or the vacant state on the basis of the magnitude relationship between the detected load W and the threshold value (i.e. the first threshold value W1 or the second threshold value W2). Then, in the case where the seat 1 is determined to be in the occupied state when the shock generated due to the vehicle collides is detected by each of the load sensors 14, the diagnosis information indicating the necessity of the zero-point adjustment to be executed to each of the load sensors 14 is stored in the memory 35. On the other hand, in the case where the seat 1 is determined to be in the vacant state when the shock generated due to the vehicle collides is detected by each of the load sensors 14, the diagnosis information indicating that the zero-point adjustment does not need to be executed to each of the load sensors 14 is stored in the memory 35. Accordingly, the detection of the shock generated when the vehicle collides by each of the load sensors 14 is informed to the occupant including the driver by the indicator 44. Then, in the case where the user takes the vehicle to the maintenance factory, the maintenance engineer may be allowed to check the necessity of the zero-point adjustment of each load sensor 14 on the basis of the diagnosis information stored in the memory 35. Accordingly, the maintenance engineer does not need to perform the operation relating to the zero-point adjustment in the case where the diagnosis information indicates that the zero-point adjustment does not need to be executed to each of the load sensors 14, which may result in reducing the hours relating to the maintenance.

According to the embodiment, the threshold value includes the predetermined first threshold value W1 and the predetermined second threshold value W2, wherein the predetermined first threshold value W1, which is used as the threshold for switching the determination result of the CPU 31 from the occupied state to the vacant state of the seat 1, and the predetermined second threshold value W2, which is used as the threshold for switching the determination result of the CPU 31 from the vacant state to the occupied state, are set to have different values from each other so that the switching of the seating state of the seat 1 between the occupied state and the vacant state less frequently occurs.

Accordingly, the frequent shift of the determination result obtained by the CPU 31 between the occupied state and the vacant state of the seat 1, which is likely to occur due to a slight fluctuation of the detected load W in proximity of the threshold value (i.e. the first threshold value W1 or the second threshold value W2), may be avoided.

According to the embodiment, the load sensing device further include the delay means (the CPU 31), which is configured so as to switch the determination result of the CPU 31 between the occupied state and the vacant state of the seat 1 in the case where the magnitude relationship between the detected load W and the threshold value (i.e. the first threshold value W1 or the second threshold value W2) is continued for the predetermined time (i.e. the first time T1 or the second time T2).

Accordingly, the frequent shift of the determination result obtained by the CPU 31 between the occupied state and the vacant state of the seat 1, which is likely to occur due to the temporal fluctuation of the detected load W, may be avoided. Specifically, even if the detected load W unstably fluctuates (shifts) because of the disturbance and the like, the frequent shift of the determination result obtained by the CPU 31 between the occupied state and the vacant state of the seat 1 may be further controlled.

According to the embodiment, the control portion 24 detects the shock generated due to the collision of the vehicle on the basis of the shift of the load signal outputted from each of the load sensors 14.

Accordingly, because the control portion 24 of each of the load sensors 14 is configured so as to detect the shock generated when the vehicle collides by using the load signal outputted from each of the load sensors 14, for example, a specific sensor (e.g. the acceleration sensor and the like) for detecting the shock generated when the vehicle collides does not need to be included at the load sensing device. Accordingly, the number of components used for the load sensing device may be reduced.

Accordingly, the unnecessary zero-point adjustment may be omitted, so that the hours relating to the maintenance may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A load sensing device, which includes a load detecting device adapted to a seat and outputting a load signal in response to a strain generated at the load detecting device and which detects a load applied to the seat on the basis of the load signal outputted from the load detecting device, the load sensing device comprising;
   a determining means determining whether the seat is in an occupied state or in a vacant state on the basis of a magnitude relationship between the detected load and a threshold value;
   a collision detecting means detecting a shock generated when a vehicle collides; and
   a memorizing means storing therein a diagnosis information indicating a necessity of a zero-point adjustment of the load detecting device to be executed in a case where the seat is determined to be in the occupied state by the determining means when the shock is detected by the collision detecting means, and indicating that the zero-point adjustment does not need to be executed in a case where the seat is determined to be in the vacant state by the determining means when the shock is detected by the collision detecting means.

2. The load sensing device according to claim 1, wherein the threshold value includes a predetermined first threshold value (W1) and a predetermined second threshold value (W2), the predetermined first threshold value, which is used as a threshold for switching the determination result of the determining means from the occupied state to the vacant state of the seat, and the predetermined second threshold value, which is used as a threshold for switching the determination result of the determining means from the vacant state to the occupied state, are set to have different values from each other so that a switching of a seating state of the seat between the occupied state and the vacant state less frequently occurs.

3. The load sensing device according to claim 1 further comprising a delay means, which is configured so as to switch the determination result of the determining means between the occupied state and the vacant state of the seat in a case where the magnitude relationship between the detected load and the threshold value is continued for a predetermined time.

4. The load sensing device according to claim 1, wherein the collision detecting means detects the shock generated due to a collision of the vehicle on the basis of a shift of the load signal outputted from the load detecting member.

5. The load sensing device according to claim 2 further comprising a delay means, which is configured so as to switch the determination result of the determining means between the occupied state and the vacant state of the seat in a case where the magnitude relationship between the detected load and the threshold value is continued for a predetermined time.

6. The load sensing device according to claim 2, wherein the collision detecting means detects the shock generated due to a collision of the vehicle on the basis of a shift of the load signal outputted from the load detecting member.

7. The load sensing device according to claim 3, wherein the collision detecting means detects the shock generated due to a collision of the vehicle on the basis of a shift of the load signal outputted from the load detecting member.

8. A seat load sensing device comprising;
   determining means for determining whether a seat mounted of a vehicle is in an occupied state or in a vacant state on the basis of a comparison between a strain of the seat that is indicative of a load applied to the seat and a threshold value;
   collision detecting means for detecting a shock generated upon collision of the vehicle with another structure; and
   memorizing means for storing therein a diagnosis information indicating a necessity of a zero-point adjustment of the load detecting device to be executed in a case where the seat is determined to be in the occupied state by the determining means when the shock is detected by the collision detecting means, and indicating that the zero-point adjustment does not need to be executed in a case where the seat is determined to be in the vacant state by the determining means when the shock is detected by the collision detecting means.

9. The load sensing device according to claim 8, wherein the threshold value includes a predetermined first threshold value (W1) and a predetermined second threshold value (W2), the predetermined first threshold value, which is used as a threshold for switching the determination result of the determining means from the occupied state to the vacant state of the seat, and the predetermined second threshold value, which is used as a threshold for switching the determination result of the determining means from the vacant state to the occupied state, are set to have different values from each other so that a switching of a seating state of the seat between the occupied state and the vacant state less frequently occurs.

10. The load sensing device according to claim 8 further comprising a delay means, which is configured so as to switch the determination result of the determining means between the occupied state and the vacant state of the seat in a case where the magnitude relationship between the detected load and the threshold value is continued for a predetermined time.

11. The load sensing device according to claim 8, wherein the collision detecting means detects the shock generated caused by the collision of the vehicle on the basis of a shift of the load signal outputted from the load detecting member.

12. The load sensing device according to claim 9 further comprising delay means, which is configured so as to switch the determination result of the determining means between the occupied state and the vacant state of the seat in a case where the magnitude relationship between the detected load and the threshold value is continued for a predetermined time.

13. The load sensing device according to claim 9, wherein the collision detecting means detects the shock generated caused by the collision of the vehicle on the basis of a shift of the load signal outputted from the load detecting member.

14. The load sensing device according to claim 10, wherein the collision detecting means detects the shock generated caused by the a collision of the vehicle on the basis of a shift of the load signal outputted from the load detecting member.

15. The load sensing device according to claim 1, further comprising an alarming device alarming that the shock is detected by the collision detecting means.

16. The load sensing device according to claim 1, wherein the load sensing device is configured to be connectable to a testing instrument via a communication circuit, and wherein the diagnosis information is outputted to the testing instrument.

17. The load sensing device according to claim 8, further comprising an alarming device alarming that the shock is detected by the collision detecting means.

18. The load sensing device according to claim 8, wherein the load sensing device is configured to be connectable to a testing instrument via a communication circuit, and wherein the diagnosis information is outputted to the testing instrument.

* * * * *